Aug. 18, 1942.  W. J. WESSELER  2,293,374
REPAIR DEVICE AND METHOD OF APPLYING THE SAME
Filed Aug. 22, 1939
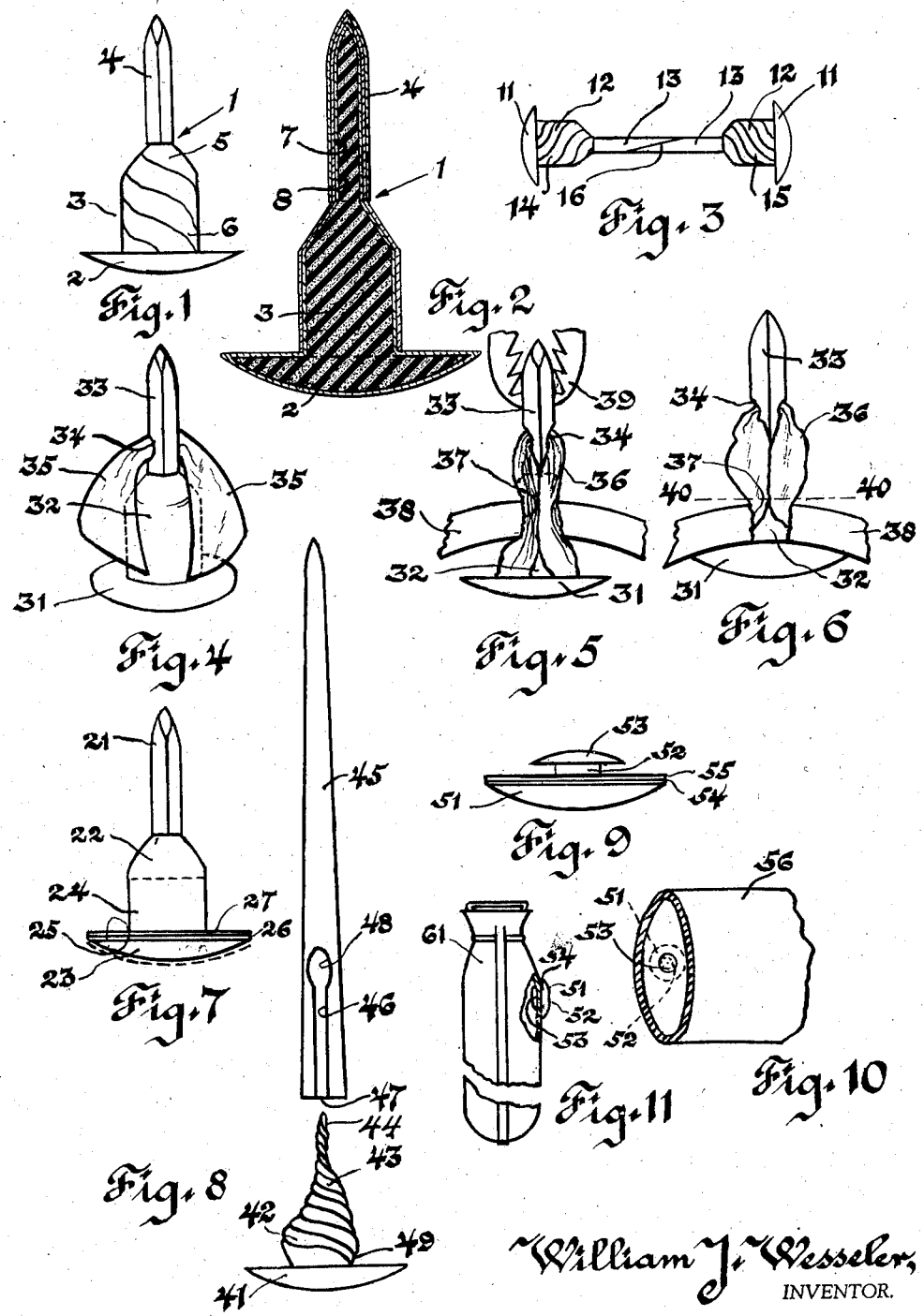
William J. Wesseler,
INVENTOR.
BY Saywell & Wesseler,
ATTORNEYS.

Patented Aug. 18, 1942

2,293,374

UNITED STATES PATENT OFFICE 2,293,374

REPAIR DEVICE AND METHOD OF APPLYING THE SAME

William J. Wesseler, East Cleveland, Ohio

Application August 22, 1939, Serial No. 291,392

8 Claims. (Cl. 152—370)

This invention, as indicated, relates to a repair device and method of applying the same. More particularly it comprises a device adapted to seal openings in rubber articles of a wide variety of structures, including the relatively stiff carcasses of automobile tires and the highly elastic material of the inner tubes, and also hot water bottles and similar rubber articles. It also includes the method of applying such articles with a minimum of effort through the elimination of the greater portion of the friction ordinarily encountered in making such repairs with a plug-like type of sealing device.

The principal object of the present invention is to provide a novel type of sealing member which may be in the form of a device having a narrow neck portion to engage within the aperture to be sealed and a head portion to bear against the one wall of the article adjacent the aperture to be sealed.

Another object of the invention is to provide a device of the character just mentioned having an additional member opposite the head member to exert a certain degree of pressure upon the opposite wall of the article adjacent the point of repair.

Another object of the invention is to provide the sealing members mentioned in the two preceding paragraphs with impervious outer skin surface at the point of contact with the article to be repaired, and with an inner soft porous sponge-like structure adapted for full cushioning effect without displacement of the portions thereof in contact with the article to which it is applied.

Another object of the invention is to provide a sponge rubber repair plug adapted to be utilized in the puncture-aperture of tire casings as well as punctures through soft rubber articles, such as inner tubes, hot water bottles and the like.

Another object of the invention is to provide a sealing device of sponge rubber with non-porous skin areas and soft portion skin structure associated with means permitting the same to be readily inserted through a puncture-aperture with a minimum degree of friction.

Another object of the invention is to provide for the production of sponge rubber tire casing repair plugs in pairs having their stem portions connected whereby their central portions may be more readily compressed within inserting terminals to facilitate their introduction into the puncture-aperture of tire casings and the like.

Another object of the invention is to provide for the application of friction reducing means to the upper portions of the repair device to permit easy insertion of the same in place and the subsequent removal of such anti-friction element.

Another object of the invention is to provide for the manufacture of sponge rubber repair plugs in pairs having an intermediate constricted central section adapted to be elongated and confined within inserting terminals subsequently provided with sharpened ends through the separation of such devices for use in inserting such plugs in position in the puncture-aperture of the tire.

Another object of the invention is to provide plugs of the character hereinabove referred to with a contact face on the inner surface of the head portion thereof formed of adhesive material, such as non-cured rubber or the like whereby a fully flexible sealing of a puncture-aperture may be brought about without danger of applying any strain to the sealing surfaces thereof.

A further object of the invention is to provide repair plugs for tire casings and the like formed of sponge rubber with external head portions thereof with a non-friction surface to prevent frictional engagement with an adjacent surface of an inner tube.

Other and further objects of the invention will appear in the course of the following description.

To the accomplishment of the foregoing and related ends, said invention, then, consists of the means and method hereinafter fully described and particularly pointed out in the claims, the annexed drawing and the following description setting forth in detail certain means and methods embodying the invention, such disclosed means and method constituting, however, but several of various forms in which the principle of the invention may be used.

In said annexed drawing:

Fig. 1 is a side elevation of a device embodying the principle of the invention;

Fig. 2 is a greatly enlarged sectional diagrammatic view showing the internal structure of the type of repair device shown in Fig. 1;

Fig. 3 is a side elevation showing a pair of plugs as made by a single operation preliminary to the forming of the inserting points by cutting the terminal elements thereof;

Fig. 4 is a perspective view of a modified form of repair device;

Fig. 5 is a diagrammatic view showing the manner of inserting a device of the type shown in Fig. 4 in a puncture-aperture of a tire casing;

Fig. 6 is a view similar to Fig. 5 but showing the device fully inserted in final repair position in a tire casing preliminary to cutting away and discarding the excess material of the device;

Fig. 7 is a side elevation of another modified form of repair device;

Fig. 8 is a side elevation of an independent inserting tool associated with a plug prepared for engagement therein preliminary to insertion of such plug in a puncture-aperture in a tire casing;

Fig. 9 is another form of device embodying the principles of the invention such device being modified for use primarily in repairing rubber structures with elastic walls, such as inner tubes, hot water bottles, and the like;

Fig. 10 is a diagrammatic view showing a device of the type shown in Fig. 9 as applied to an inner tube; and Fig. 11 is a view similar to Fig. 10 showing the device illustrated in Fig. 9 as applied to a hot water bottle.

As is clearly shown in Figs. 1 and 2 of the drawing, the repair device 1, comprises a plug of mushroom type having a head portion 2, a stem portion 3, and an inserting terminal 4. As shown more clearly in Fig. 2, the plug is preferably formed of sponge rubber, both the head and stem sections preferably having as integral parts thereof the tough impervious non-porous skin formed on the exterior surfaces of sponge rubber articles at their point of contact with the molds in which they are formed. This insures an airtight seal after the insertion of the stem portion of the plug in the puncture-aperture of the tire casing even though the stem of the plug when cut off exposes the porous interior of the stem to the air outside the tire casing. It has been found that the stem will soon wear flush with the outer surface of the tire casing and will thereafter resist further wear and will continue as a satisfactory seal for the puncture opening for a long period of service. The sponge rubber plug stem conforms very closely to the irregularities of the walls of the puncture opening and resists displacement to a greater degree than a solid rubber stem of the conventional repair plug. It will remain in place when a tire casing is spread for inspection and further repair, and it will cause practically no deformation of the surface of the tire casing adjacent the point of repair. It forms a practically integral seal conforming to the outline of the cut or nail hole, however irregular, and putting the walls of the tire casing under no strain but at the same time completely sealing the opening and maintaining such seal over a long period of service without further attention.

The sponge rubber stem is highly compressible and the active portion of the stem for the sealing operation may be pre-compressed along with the balance of the stem or may be retained at its original size adjacent the head portion, being compressed when drawn into the puncture-aperture. At such time it may be sheathed within a cellulose sheet, such as a "Cellophane" strip 5 wound about the stem over substantially its entire length, being loosely wound at the base portion 6 of the stem, and having a tightly twisted section 7 within the metal inserting terminal 4. The rubber stem is preferably of reduced diameter at its free end which is engaged within the terminal 4 and is formed with a frusto-conical portion connecting the narrow end portion with the large cylindrical sealing area of the stem adjacent the head. The skin 8 formed on the plug exterior when molded gives the plug greater resistance to tearing forces on its exterior. The skin is not smooth, however, and affords an excellent sealing member to hold its position within a puncture-aperture in practically permanent relation. It is not disturbed by flexing since the entire plug structure with the hollow areas provided by the large pores of the interior provides for the maximum elasticity and cushioning effect and prevents any leverage being applied to dislodge or disrupt the sealing surfaces.

The plugs may be formed in the molds in pairs, as shown in Fig. 3, with their heads 11 at the ends and with their stems 12 joined as an integral structure. When so formed the central reduced area 12 of the stem may be further reduced by twisting such portion, or by compressing it while wrapping it tightly with a "Cellophane" strip. Two such strips 14, 15, may be employed so as to start winding loosely on each stem adjacent the head and then winding more tightly as the center line of the structure is approached. When the winding is completed a narrow split sleeve is tightly crimped upon the central narrow area of the stem over the "Cellophane" winding which is thus held in position over its entire extent and then severed along the line 16. It is so maintained until the plug is used, and is then discarded along with the terminal and excess stem length when the plug is cut close to tire casing surface, as indicated in Fig. 6. For certain sizes of plugs there need be no tapered or reduced section in the stem portion, and the plugs may be formed individually, if desired, instead of in pairs. Likewise the "Cellophane" wrapper need not be used if proper rubber composition is used. The outside of the rubber head and the non-sealing portion of the stem may be coated with a glossy rubber paint of elastic character, such as those with a tung oil base. In such case, as shown in Fig. 7, the terminal 21 and part of the stem 22, and the outside of the head 23, may be painted, the sealing portion of the stem 24, and the inner face of the head 25 being uncoated. The inner face of the head may carry an annulus of adhesive or uncured rubber 26 with a linen protector 27 temporarily engaged thereover.

In lieu of either a permanently affixed hood of "Cellophane," as in the structure shown in Figs. 1 to 3, or a painted area as in the structure shown in Fig. 7, the "Cellophane" sheet may be a wholly separate sheet to be applied to the device preliminary to repairing the puncture. This type of structure is shown in Figs. 4, 5 and 6, wherein the plug having a head 31, and stem 32, preferably of sponge rubber, is also provided with an inserting terminal 33 having a transverse opening 34 at an intermediate point through which may be engaged a sheet of "Cellophane" 35 of suitable size and toughness and flexibility, such free ends of the "Cellophane" being formed, in effect, into a tubular casing 36 or wrapper of extremely non-frictional characteristics, and which makes it possible to set the plug head and lower stem areas in sealing position with a minimum of effort. The inserting terminal 33 is first engaged through the puncture-aperture 37 of the tire casing 38, and by means of a pliers 39, or the like, the stem is then drawn through the puncture opening, as shown in Fig. 5, until the head contacts the inner wall of the tire casing 38. The stem 32 is cut off a short distance above the outer surface of the tire casing, as along the line 40, the balance of the material outwardly of such line being discarded.

While a completely assembled unit, such as is shown in Figs. 1 and 3, is the preferred form of construction, many variations thereof may be made, such as the use of a glossy painted area providing non-friction qualities, such as is shown in Fig. 7. The structure shown in Figs. 4 to 6, inclusive, is fully assembled, except for the insertion and shaping of the "Cellophane" sheet. Instead of being in sheet form this may be a pre-formed "Cellophane" hood, initially in the shape shown in Fig. 5. Such hood would slip over the inserting terminal and the stem. However, it could be made a snug fit for the stem of a plug without an attached inserting tool, the stem with its enclosing hood being inserted first in the socket of an independent inserting tool or needle of the general type shown in Fig. 8.

The structure shown in Fig. 8 comprises a sponge rubber plug of mushroom shape 41, with its stem portion wrapped in "Cellophane," the lower part 42 of the stem having little or no compression, and the free end portion 43 of the stem being highly compressed by the "Cellophane" winding. The free end 44 of the "Cellophane" strip may be twisted into a tight strand which can be engaged within the hollow stem of the pointed inserting tool or needle 45. The tool may have one or more slots 46 about the socket 57 in its base, so that the plug stem may be engaged therein. Where the plug stem is unwrapped the stem must be manually compressed and forced into the socket. This engagement may be assisted by twisting the plug stem. Where the plug stem is wrapped, as shown in Fig. 8, the strand 44 may be engaged into the hollow interior of the tool at the top of the slot where an enlarged opening 48 is provided to receive the wrapped compressed end of the stem. By twisting and stretching and compressing the remaining portion of the stem it may then be engaged in the inserting tool. The repair is made by inserting the pointed end of the tool through the puncture opening in the tire casing from the inside of the casing and pulling the tool so engaged with the stem through such opening until the head of the plug bears tightly against the inner wall of the casing. An annulus of uncured rubber, or the like, may be used to attach the inner face of the head to the wall, but even without such adhesive a very satisfactory repair will have been provided. The tool socket readily slips off the free end of the stem when the head of the plug abuts the inner casing wall. The "Cellophane" wrapping is readily removable and practically all of it is cut off when the projecting portion of the stem is severed close to the outer surface of the tire casing.

The plug stem shown in Fig. 8 is given an inward taper 49 adjacent the head to provide for an outward pull on the stem with the flexing of the tire. Such taper may be embodied in the construction of the stem in all of the instances illustrated, but such additional adhesion is not of importance where proper selection of sponge rubber composition is made, as in such instances the engagement of the stem with the puncture walls is of a character not to be disturbed by any degree of flexing of the tire, as is frequently the case with other types of plug structures.

In Fig. 9 is shown a flat type of plug having a large head 51, having a short stem 52 terminating in a button-type secondary head 53. It may be provided with an annulus 54 of uncured rubber or the like, having a linen protective cover 55. This type of plug is suitable for repairing inner tubes 56, as shown in Fig. 10, the cut portion of the tube being stretched to engage over the button, after which the linen protective cover is torn from the adhesive surface of the outside head progressively while pressing the exposed uncured rubber surface against the outer surface of the inner tube. The same procedure is followed to seal a leak in a hot water bottle or the like 61, as shown in Fig. 11. The plug sizes may be varied for repairing minor and major cuts, but in every instance repairs may be made with greater dependability than where repairs by means of flat patches of sheet rubber are used. The sponge rubber has great capacity for adherence to the surface of the article being repaired. Its cushioning effect is such as to resist all efforts to dislodge it. By having glossy painted surfaces on the outer surfaces of the plugs, there is no stiffness or interference with other articles with which the repaired area comes in contact.

Other modes of applying the principle of my invention may be employed instead of those explained, change being made as regards the structure herein disclosed, provided the means stated by any of the following claims or the equivalent of such stated means be employed.

I therefore particularly point out and distinctly claim as my invention:

1. A repair device for rubber articles comprising a mushroom shaped plug having a head section and a stem section formed wholly of sponge rubber with an impervious outer skin over the head surfaces and the side wall surfaces of said stem.

2. A repair device for rubber articles comprising a molded plug having a head and stem formed wholly of sponge rubber, and having the original mold contact skin over the entire outer surfaces of the head and over the side wall and end surfaces of the stem.

3. A repair device for rubber articles comprising a mushroom shaped plug having a head section and a stem section formed wholly of sponge rubber with an impervious outer skin over the head surfaces and the side wall surfaces of said stem, and a thin glossy flexible inserting means with a low coefficient of friction applied to areas of said stem section.

4. A repair device for rubber articles comprising a mushroom shaped plug having a head section and a stem section formed wholly of sponge rubber with an impervious outer skin over the head surfaces and the side wall surfaces of said stem, and means providing a glossy surface covering providing a low coefficient of friction applied to areas of said stem section and head section.

5. A repair device for rubber articles comprising a molded mushroom shaped plug formed wholly of sponge rubber, and having a head section, and a stem section, and a flexible element of material having a low coefficient of friction engaged in compressing relation about said stem section.

6. A repair device for rubber articles comprising a molded plug formed wholly of sponge rubber with a layer of mold skin intact over a full sealing area thereof, and a strip of flexible material having a low coefficient of friction applied over a portion of said plug in compressing relation to reduce the size thereof for engagement through a puncture-aperture.

7. A method of inserting a highly compressible elastic plug of mushroom shape, having a head section and a stem section in the puncture-aperture of a tire casing, which includes the steps of compressing the stem of said plug to small diameter within a winding of thin flexible inserting material with a low coefficient of friction, drawing said plug through said aperture, and thereafter removing said material.

8. A repair unit comprising a highly compressible elastic plug, means attached to said plug for inserting the same in a puncture aperture, and thin flexible means having a low coefficient of friction engaged within and coacting with said inserting means for reducing the friction on said plug.

WILLIAM J. WESSELER.